Sept. 14, 1948.  C. B. WELLER  2,449,188
TICKET MARKING AND ATTACHING MACHINE
Filed Nov. 6, 1945  7 Sheets-Sheet 3
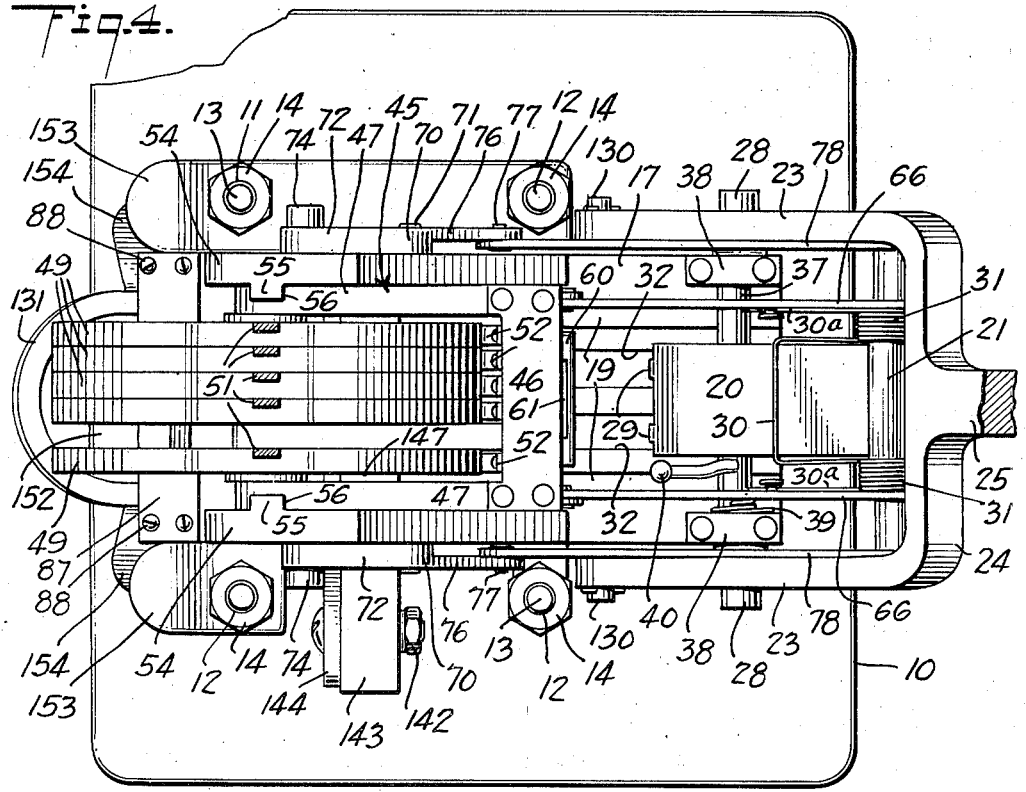
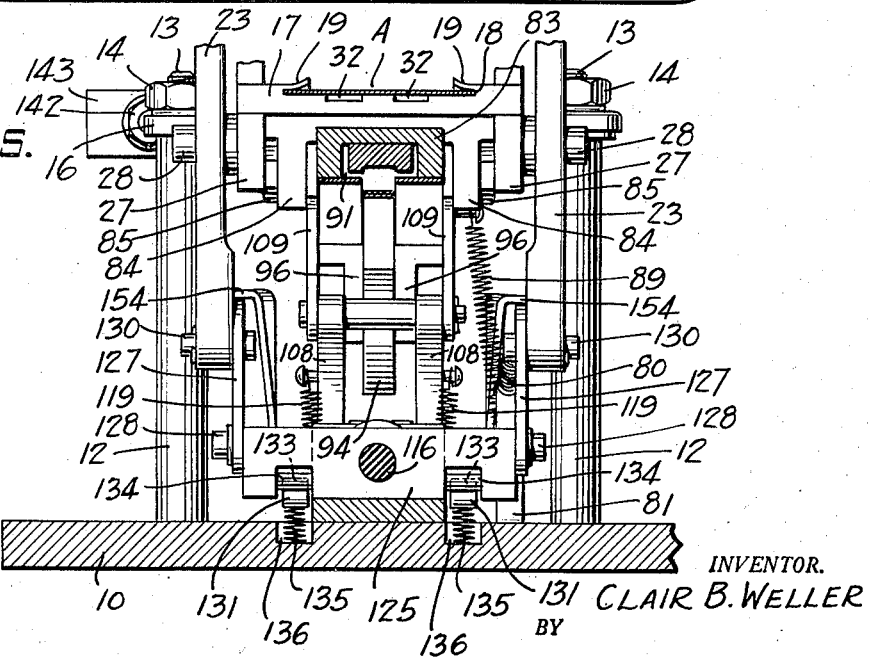
INVENTOR.
CLAIR B. WELLER
BY
Frederick Diehl
ATTORNEY Sept. 14, 1948.  C. B. WELLER  2,449,188
TICKET MARKING AND ATTACHING MACHINE
Filed Nov. 6, 1945  7 Sheets-Sheet 4
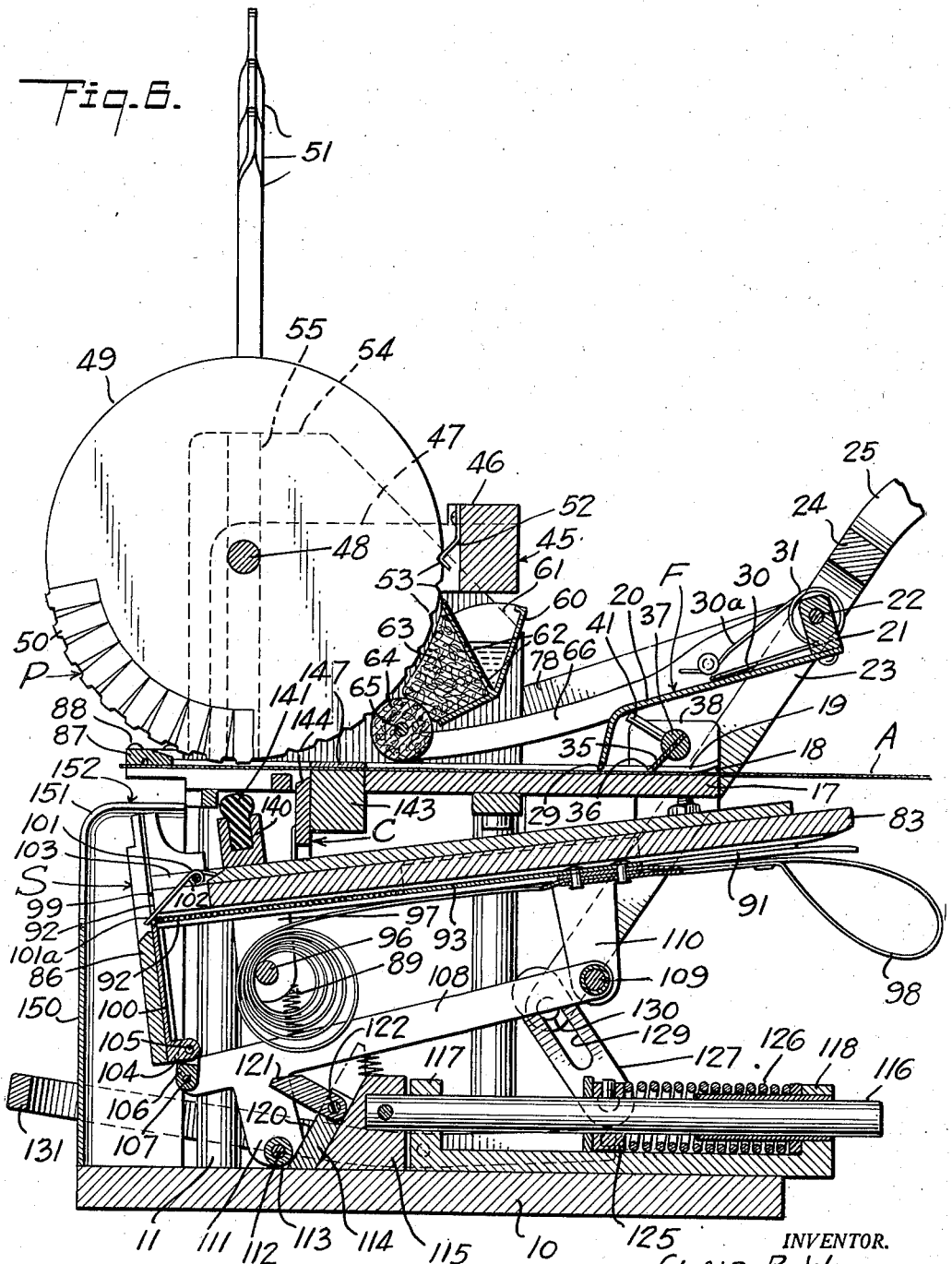

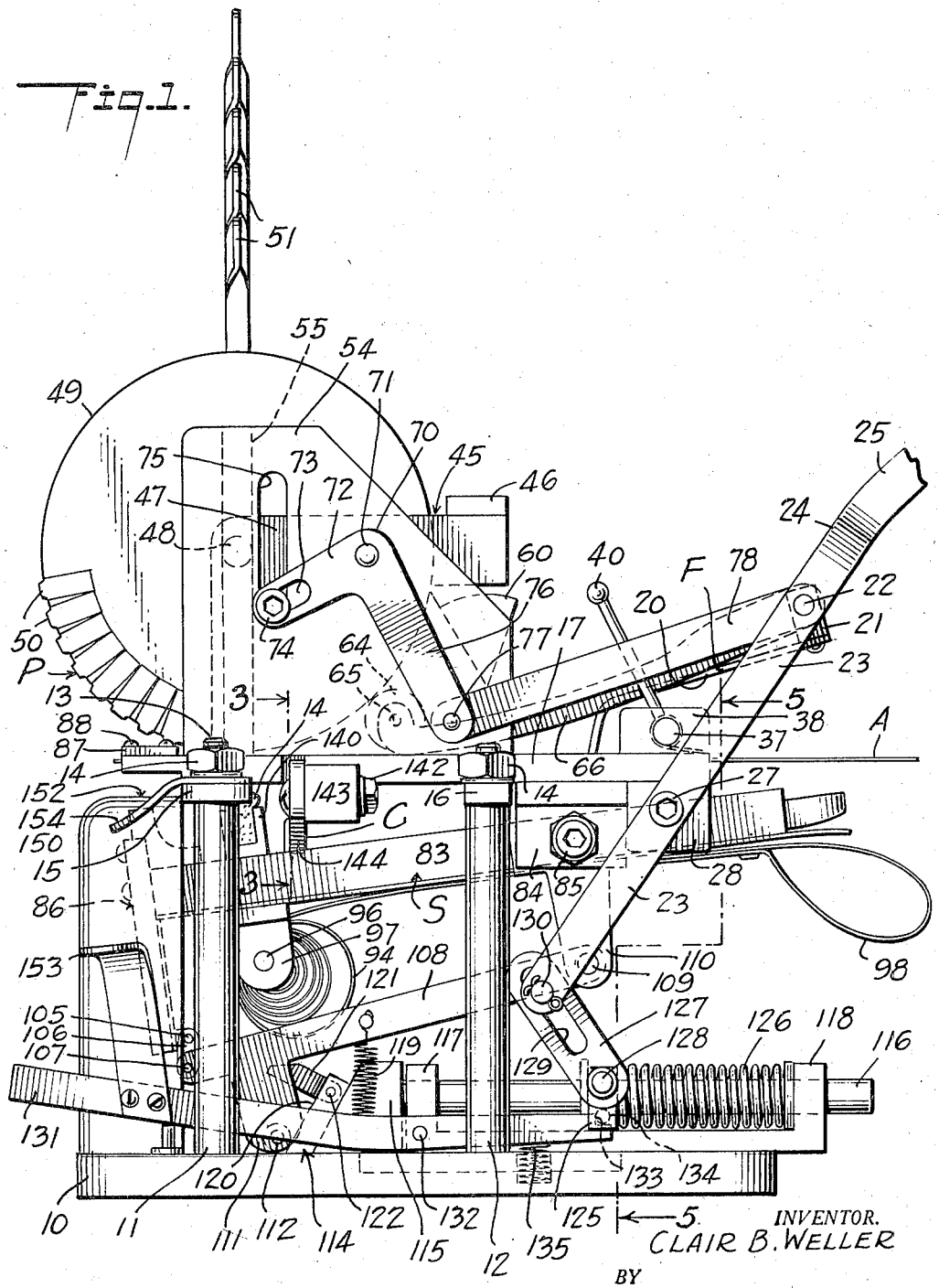

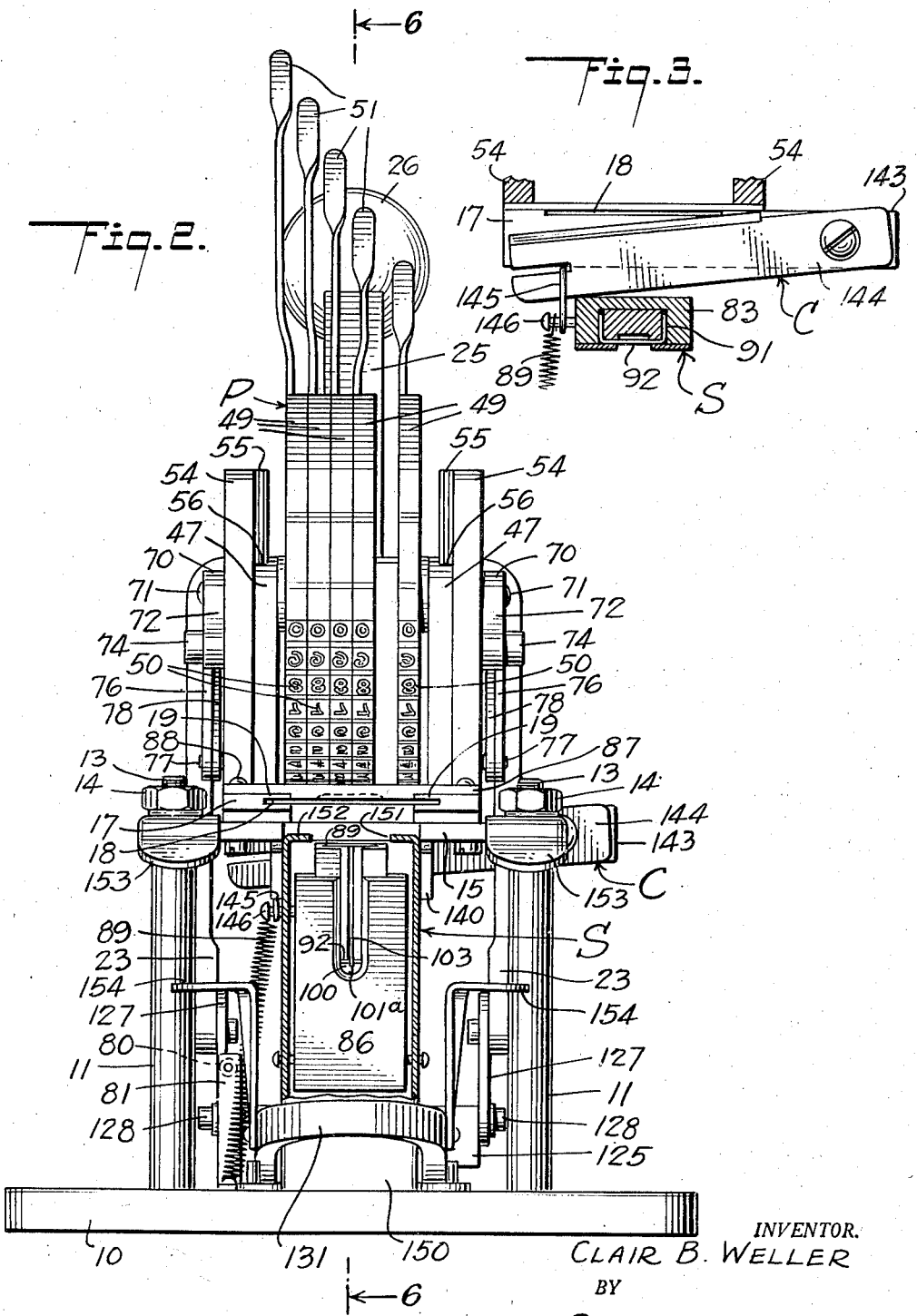

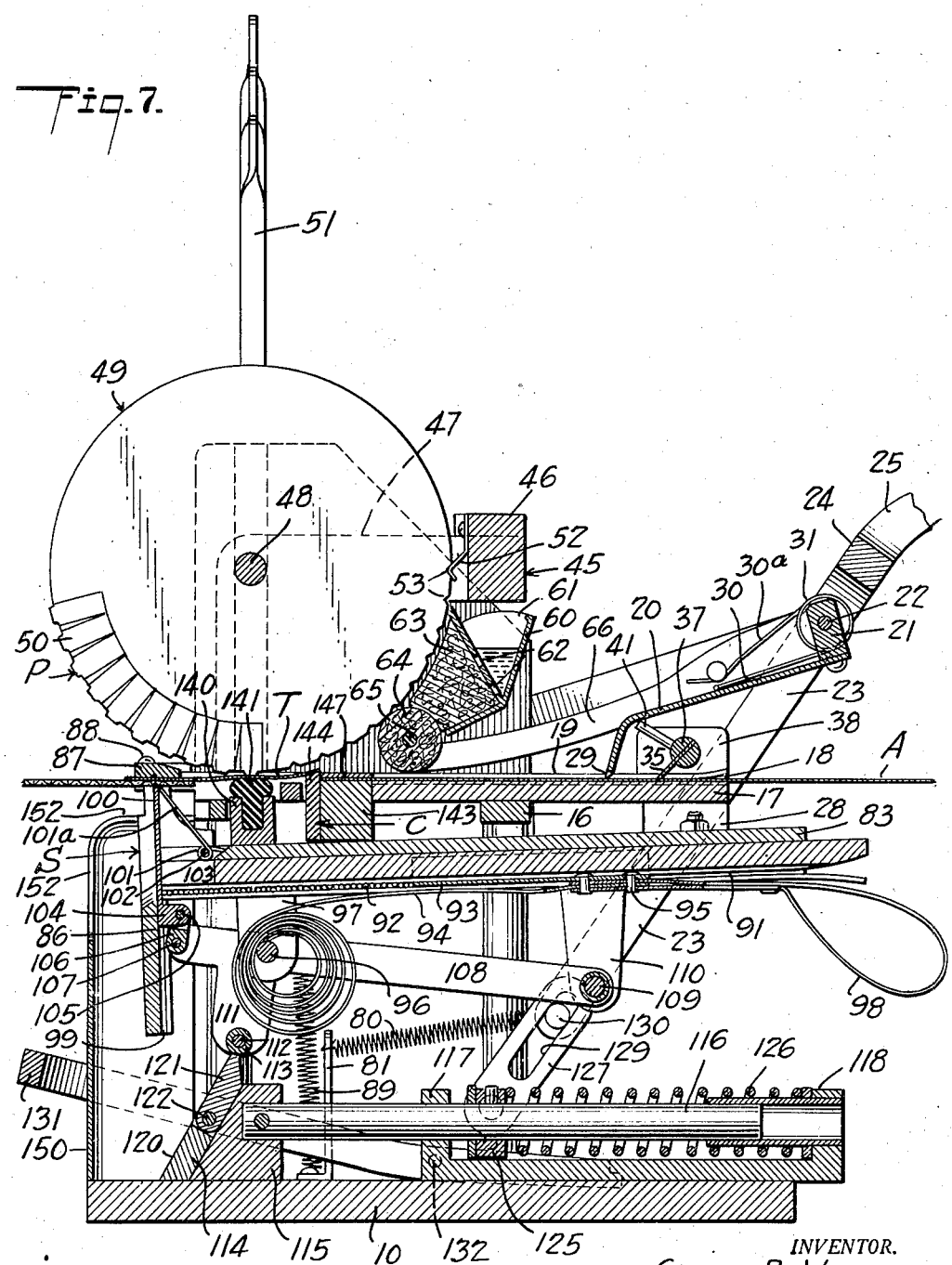

Sept. 14, 1948.   C. B. WELLER   2,449,188
TICKET MARKING AND ATTACHING MACHINE
Filed Nov. 6, 1945   7 Sheets-Sheet 6

INVENTOR.
CLAIR B. WELLER
BY
Frederick Diehl
ATTORNEY

Sept. 14, 1948.    C. B. WELLER    2,449,188
TICKET MARKING AND ATTACHING MACHINE
Filed Nov. 6, 1945    7 Sheets-Sheet 7
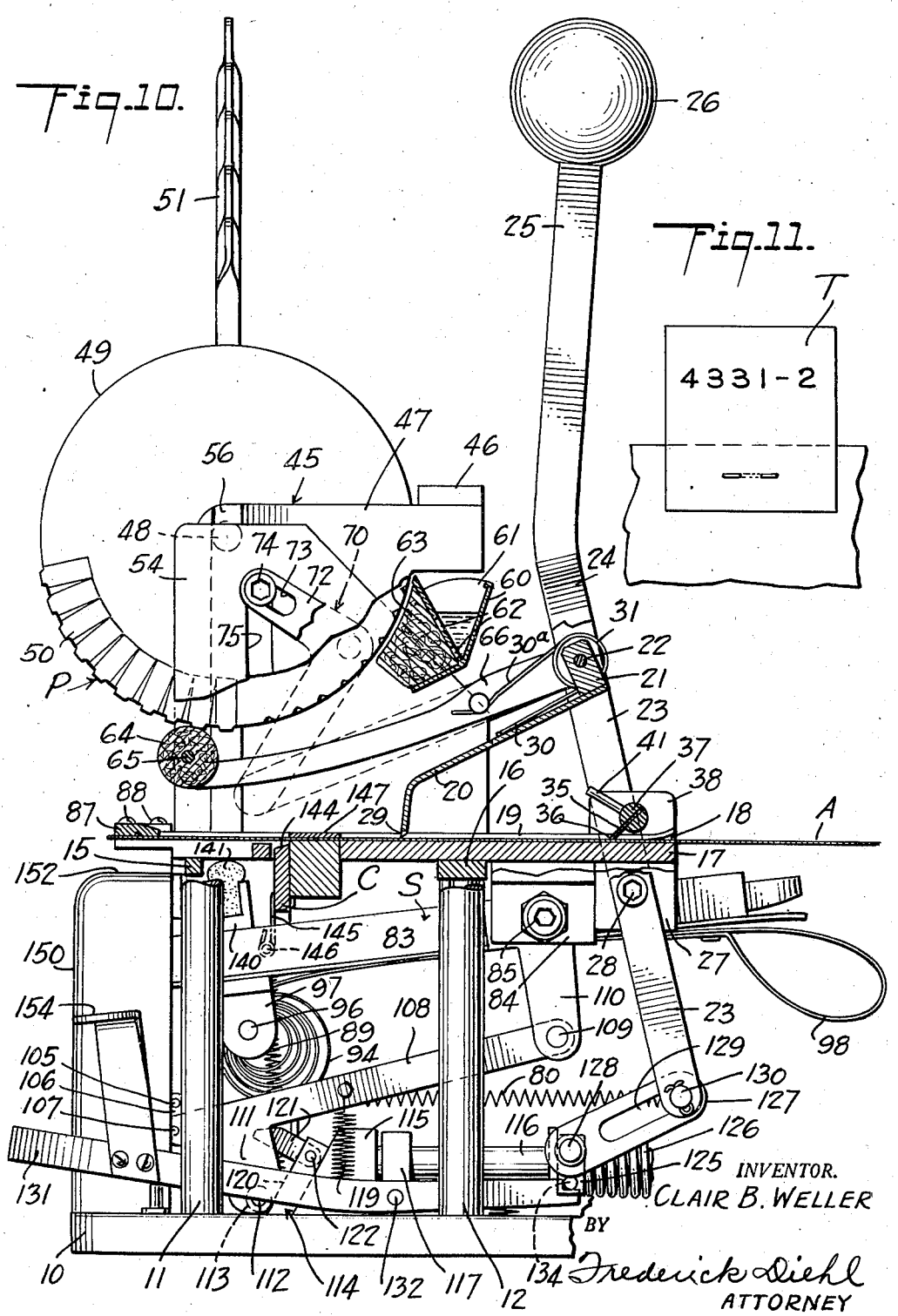
INVENTOR.
CLAIR B. WELLER
BY
Frederick Diehl
ATTORNEY Patented Sept. 14, 1948

2,449,188

UNITED STATES PATENT OFFICE 2,449,188

TICKET MARKING AND ATTACHING MACHINE

Clair B. Weller, Los Angeles, Calif., assignor of one-half to Duane C. Maddux, Los Angeles, Calif.

Application November 6, 1945, Serial No. 626,922

18 Claims. (Cl. 93—88)

This invention relates to and has for an object the provision of a machine of the general character embodied in the co-pending application of Duane C. Maddux, Serial No. 591,486, filed May 2, 1945, and wherein is broadly disclosed and claimed a mechanism intended to receive ticket material from a supply roll and to cut the material into tickets which are marked and attached to garments or other goods for the purpose of identification in accordance with a code or other system of denoting ownership.

Another object of the present invention is to provide a machine of the above described character which performs the several functions of stock feeding, type inking, printing, stapling and cutting the stapled and printed portion of the stock from the remainder thereof, by a compact arrangement of parts whose rugged construction insures long operational life free of costly maintenance; whose operation is absolutely positive and accurate to securely staple a ticket to a garment or other article, and plainly print a preselected identification mark thereupon; and which is manually set to load a power spring, feed the strip stock a predetermined amount, and ink the printing mechanism during one movement of an operating member, for the concurrent stapling, printing and cutting-off of the stock in response to tripping of the loaded power spring.

In a broader aspect, another object of this invention is to provide a stapling mechanism with which is operatively associated a power actuating means adapted to exert a momentary force upon the stapling mechanism to effect a stapling operation when the actuating means is released from a set position to create such force.

It is a further object of this invention to provide a stapling mechanism which embodies means for positively preventing the feeding of more than one staple from a supply thereof, for the stapling operation, should same not be completed and otherwise cause feeding of a second staple which would interfere with the first fed staple and jam the mechanism upon a subsequent attempt to complete the stapling operation.

With these and other objects in view, the invention resides in the combinations, arrangements and functional relationships of elements as set forth in the following specification and particularly pointed out in the appended claims.

In the accompanying drawings,

Figure 1 is a view showing in side elevation, one form of ticket marking and attaching machine embodying this invention, in its operating or "set" position;

Figure 2 is a view of the machine in front elevation, with a portion of the work rest of the machine in cross section to expose interior mechanism;

Figure 3 is a fragmentary detail sectional view taken on the line 3—3 of Figure 1, and illustrating the stock cut-off knife embodied in the machine;

Figure 4 is a plan view of the machine;

Figure 5 is a vertical transverse sectional view taken on the line 5—5 of Figure 1;

Figure 6 is a vertical longitudinal sectional view taken on the line 6—6 of Figure 2, and illustrating the operating or "set" position of the machine corresponding to Figure 1;

Figure 7 is a view similar to Figure 6 and illustrating an instantaneous position of the machine at the instant of operating upon the ticket stock and a work piece such as a garment;

Figure 10 is a view similar to Figures 6, 7 and 8, and illustrating a resetting and inking position of the machine; and Figure 11 is a plan view of a marked ticket attached to a garment or other article.

Figure 8:
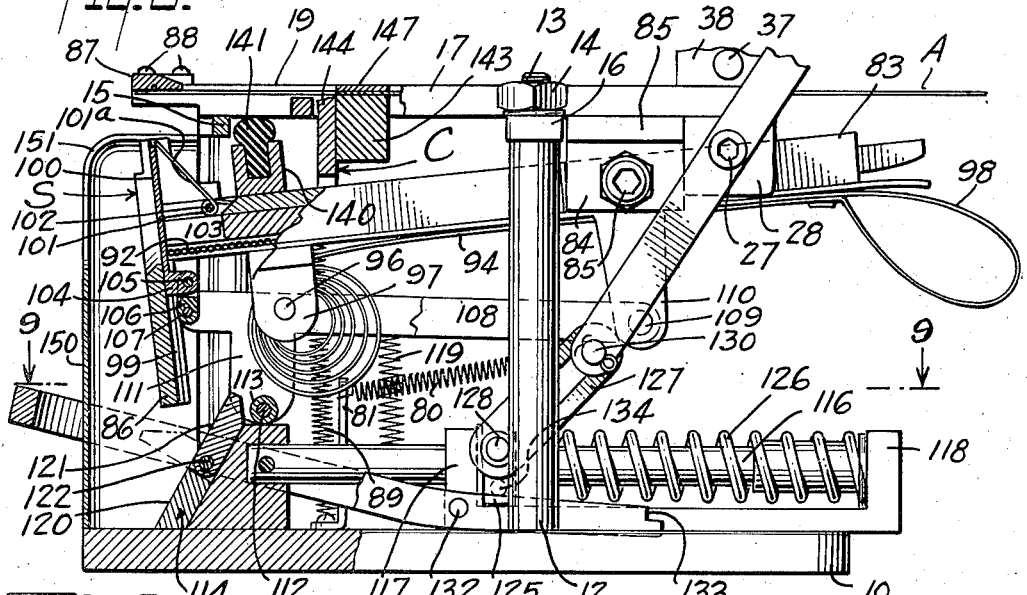
Figure 8 is a view similar to Figures 6 and 7 and illustrating the final tripped position of the machine following its operation of marking and attaching a ticket to a garment.
Figure 9:
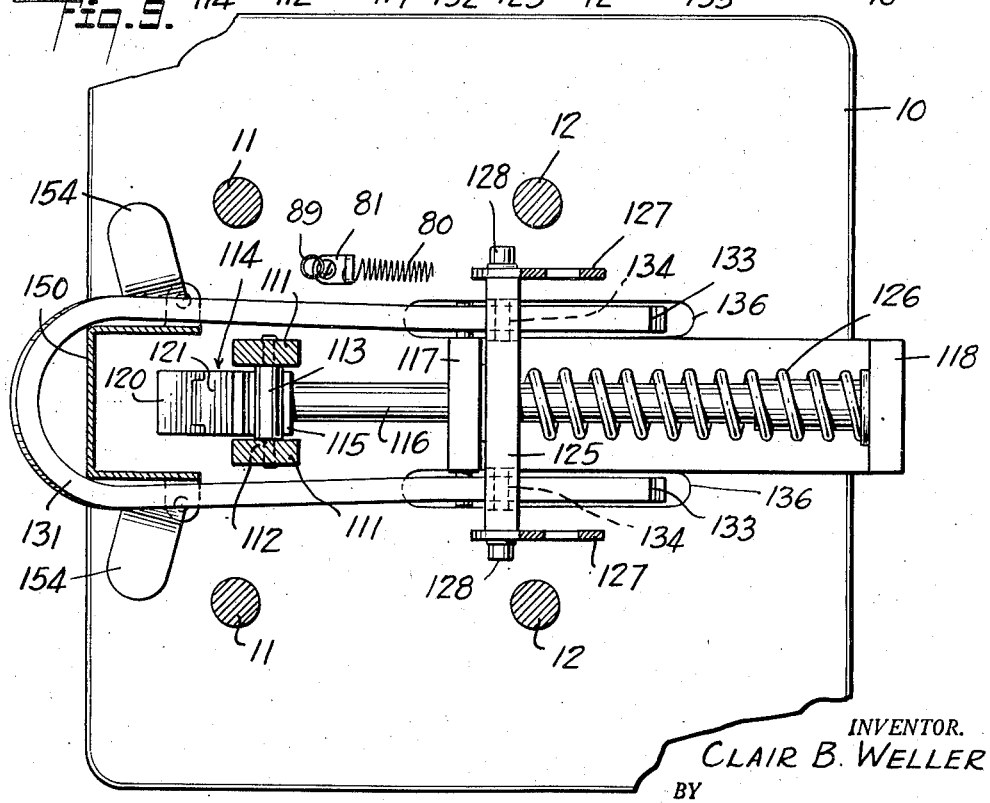
Figure 9 is a plan sectional view taken on the line 9—9 of Figure 8.

Referring specifically to the drawings, the invention in its illustrated embodiment is broadly composed of stock feeding mechanism F, marking or printing mechanism P, attaching or stapling mechanism S, and stock cut-off means C, all of which are operatively associated to perform their respective functions in synchronism during a cycle of operation of the machine.

In its specific aspect, the invention comprises a base 10 in the form of a rectangular plate from which rises pairs of front and rear posts 11 and 12, respectively, the upper ends of which are reduced in diameter and threaded at 13 to receive nuts 14 which rigidly secure to the posts transverse supporting members 15 and 16 in the form of flat bars. To the members 15 and 16 is rigidly secured a table 17 in the form of a relatively long and narrow rectangular plate having a longitudinal guideway 18 extending therethrough from one end to the other, which is open at the top except for longitudinal side retaining flanges 19 for confining a strip of paper or other ticket forming stock A to longitudinal sliding movement in the guideway for a step by step progressive feeding of the stock from the rear to the front of the machine by a feeding member or pawl 20 of the stock feeding mechanism F.

The feeding member 20 is in the form of a thin plate having a lug 21 at one end receiving a pin 22 mounted in the parallel arms 23 of the yoke 24 of an operating member 25 in the form of a lever having a ball handle 26 at its upper end, and pivotally mounted intermediate its ends on subtending brackets 27 on the table 17, by studs 28 passing through the arms 23 and the brackets 27. The other end of the feeding member 20 is bent laterally and provided with spaced feeding teeth 29 (Figure 4) which are urged into engagement with the top surface of the stock A by the U-shaped arm 30 of a coil spring 31 mounted in two portions on the reduced end portions of the lug 21 as most clearly shown in Figure 4. The feeding teeth 29 are directly opposite or above longitudinal grooves 32 formed in the bottom surface of the guideway 18 in order that the teeth will not dig into the surface of the guideway should feeding movement of the member 20 be effected in the absence of stock A in the guideway.

The stock feeding mechanism F includes a holding member 35 in the form of a rectangular plate having teeth 36 along one edge thereof and fixed to a rock shaft 37 mounted in bearings 38 on the table 17. A coil spring 39 (Figure 4) yieldingly maintains the teeth 36 in holding engagement with the stock A to prevent retrograde movement thereof, yet permit forward feeding of the stock by the feeding member 20. A releasing lever 40 projects from the shaft 37 for manual actuation to rock the shaft in opposition to the spring 39 and disengage the holding member 35 from the stock. A releasing arm 41 also projects from the shaft 37 and is adapted to engage and move the feeding member 20 clear of the stock in response to releasing movement of the shaft 37 by the lever 40, so that both members 20 and 35 will be rendered inactive to permit free and unrestricted insertion and withdrawal of the stock from the guideway 18.

The marking or printing mechanism P is composed of a generally U-shaped frame 45 whose connecting portion 46 rigidly joins two parallel, segmental shaped side plates 47 in which is supported an axle 48. Rotatably mounted on the axle 48 are several printing wheels 49 in the form of thin disks in whose peripheral portions are set a series of type 50 for printing the numerals from 1 to 9, inclusive, and zero. Each of the wheels 49 is provided with a finger lever 51 by which the wheel can be adjusted to dispose any one of the characters on the wheel in printing position wherein the particular character to be printed is perpendicularly below the axis of the axle 48.

For each of the wheels 49 there is mounted in the portion 46 of the frame 45 a spring 52, the free end portion of which is adapted to enter any one of a series of notches 53 in the periphery of the wheel, to releasably retain in printing position, the character selected for printing.

Rising from the sides of the table 17 are guide plates 54 having vertical tongues 55 on their confronting faces received in vertical grooves 56 in the side plates 47 to mount the printing mechanism P for reciprocating movement vertically to occupy a lowered, printing position as shown in Figures 1, 2, 6 and 7, and the elevated, type-inking position shown in Figure 10.

The frame 45 of the printing mechanism supports an ink fountain 60 to which ink can be supplied through an opening 61. Ink from the fountain gravitates through perforations 62 therein to a suitable transfer pad 63 from which the ink is distributed to the type 50 of the several printing wheels 59 by a distributing roller 64 carried by a shaft 65 whose end portions are mounted in the outer ends of arms 66 pivoted on the pin 22 of the operating member 25, and urged by the legs 30a of the spring 31 upwardly into engagement with the peripheries of the printing wheels 49.

The printing mechanism P is operatively connected to the operating member 25 by bell crank levers 70 pivotally mounted at 71 on the guide plates 54, with the arms 72 of the levers having slots 73 in which work headed studs 74 passing through vertical slots 75 in the guide plates 54 and threaded into the side plates 47 of the frame 45. The other arms 76 of the levers 70 are pivotally connected at 77 to links 78 pivotally mounted on the pin 22 of the operating member 25.

From the foregoing description, it will be clear that upon movement of the operating member 25 from its one extreme rearward position shown in Figures 1, 6 and 7, to its other extreme forward position shown in Figure 10, the stock A will be fed forwardly to the left in these figures, a predetermined distance corresponding to the desired length of a ticket T (Figures 7 and 11) to be cut from the stock, concurrently with which the printing mechanism P will be elevated from printing to inking position, and the distributing roller 64 will be advanced with a rolling motion from its ink-pick-up position wherein it presses against the inking pad 63, across the faces of the type 50 of the several printing wheels 49 to apply ink thereto. This movement of the lever is effected against the action of a spring 80 secured at one end to the lower free end of one of the yoke arms 23 of the operating member 25, and at its other end to a bracket 81 fixed to the base 10. Thus, upon releasing the lever 25, it will be restored to the rearward extreme position shown in Figures 1, 6 and 7; the printing mechanism P will be restored to its printing position under the action of this spring and of gravity. Concurrently, the stock feeding member 20 travels idly backward over the surface of the stock A, with the holding member 35 acting to positively prevent any retrograde movement of the stock.

The stapling mechanism S comprises an arm 83 pivotally mounted beneath the table 17 between brackets 84 by means of stub axles 85 supported in the brackets, the length of the arm being parallel to the length of the table and having at its forward end a head 86 adapted to co-act with an anvil 87 spanning the centrally cut-away forward end of the table and rigidly secured to the retained side portions thereof by screws 88. A coil spring 89 is connected to the arm 83 and to the bracket 81 to normally urge the arm downwardly to the non-stapling position shown in Figure 6 wherein the head 86 is spaced from the anvil 87.

The arm 83 constitutes a staple magazine and is provided with a staple-receiving channel 91 into which a clip of staples 92 is insertable in inverted position from the rear end of the arm. A follower 93 of U-shaped cross section to slidably fit in the channel 91 is constantly urged forwardly therein towards the head 86 by a flat spring 94 secured to the follower by rivets 95 and wound in a flat spiral about a fixed pin 96 supported between brackets 97 subtending from the arm 83.

The inner end of the spring is fixed to the pin 96 and is normally sufficiently wound to force the entire clip of staples 92 through the channel 91 from the rear to the front thereof. The outer end of the spring is formed with a finger-receiving loop 98 by which the follower 93 can be pulled entirely out of the channel 91 for the insertion of the staples.

The forward end of the channel 91 opens into a groove 99 in the head 86, which groove extends entirely through the head in right angular relation to the channel 91, and has slidably mounted therein a stapling ram 100 adapted to be reciprocated from the retracted position shown in Figure 6 wherein the upper end of the ram is immediately below the channel 91 for the feeding of a staple from the latter into the groove 99 ahead of the ram, to the advanced position shown in Figure 7 wherein the staple in the groove has been separated by the ram from the remaining staples of the clip and forced upwardly by the ram for clinching by the anvil 87, as will be later fully described. A coil spring 101 is mounted on a pin 102 spanning a vertical slot 103 in the head 86, and has the arm 101a thereof normally urged downwardly to bear against that staple in the groove 99, and is of such length as to clear the staple when the ram has been advanced to staple-clinching position.

The ram is provided at its lower end with an ear 104 through which extends a pivot pin 105, to the projecting ends of which the bifurcated upper end of a link 106 is pivotally connected by a pin 107 to the forward ends of a pair of levers 108 pivotally mounted at their rear ends on a pin 109 supported in brackets 110 subtending from and rigidly secured to the arm 83. Adjacent their forward ends, the levers 108 are provided with depending lateral extensions 111 supporting a pin 112 on which is rotatably mounted a roller 113 adapted to co-act with a cam 114 formed on the head 115 of a plunger rod 116 reciprocably mounted in bearing lugs 117 and 118 supported on the base 10. Coil springs 119 connected to the arms 108 and to the base 10 normally urge the arms downwardly and the ram 100 to its retracted position shown in Figure 6.

The cam 114 consists of a lower fixed portion 120 on the head 115, and an upper portion 121 pivotally mounted at 122 on the head to occupy the active position shown in Figure 7 wherein the cam portions co-act to present a continuous upwardly and rearwardly extending wedge surface to the roller 113, and the inactive position shown in Figure 7, for a purpose to be later fully described.

Fixed to the plunger rod 116 between the lugs 117 and 118 is a crosshead 125, and mounted on the rod between the crosshead and the lug 118 is a power coil spring 126. The crosshead is operatively connected to the lower end of the operating member 25 by means of links 127 pivotally connected at 128 to the crosshead and having slots 129 in which work pins 130 projecting from the member, all to the end of enabling the spring 126 to be compressed between the crosshead and the lug 118 and thus loaded, in response to movement of the operating member 25 from its extreme position shown in Figure 8 to its extreme position shown in Figure 10.

A latching or trigger member 131 of generally U-shape in plan, has its parallel arms projecting beneath the crosshead 125 and pivotally mounted between their ends at 132 on the lug 117, with the closed forward end of the member 131 freely receiving the stapling head 86 so as to project forwardly of the latter.

Formed on the rear extremity of the arms of the member 131 are latching shoulders 133 adapted to have latching engagement with pins 134 (Figure 5) on the crosshead 125, to releasably retain the crosshead in its rearmost position wherein the power spring 126 is fully loaded as shown in Figures 1 and 6. Springs 135 seating in recesses 136 in the base 10 and bearing against the arms of the member 131, urge the latter to its latching position shown in these figures, for co-action of the shoulders 133 and pins 134 in releasably retaining the spring 126 loaded.

Supported on the stapling arm 83 is a U-shaped holder 140 in which is mounted a yieldable pressure member 141 such as a pad of elastic rubber which functions during an operation of the machine to exert an upward pressure through an opening in the table 17 against the stock A directly opposite the type 50 on the printing wheels 49 selected for printing upon the stock, so as to produce a firm impression of the type on the stock.

Pivotally mounted at 142 on a lateral extension 143 of the table 17 is the cutting off means C in the form of a cutting blade 144 loosely connected adjacent its free end by a wire link 145 to the spring anchor pin 146 of the spring 89 on the arm 83, and adapted to co-act with fixed cutting blade 147 of the cutting-off means, spanning the open top of the guideway 18 transversely, to shear through the stock A by upward movement of the arm 83 against the cutting blade 144 during an operation of the machine, so as to cut off a portion of the stock to form the ticket T.

Supported on the base 10 to project upwardly within the closed forward end of the trigger member 131, is a cover 150 which encloses the stapling head 86 in the lowered, non-stapling position thereof shown in Figure 6, and has a slot 151 through which the upper end of the stapling head projects when in stapling position as shown in Figure 7. The top flat surface of the cover 150 forms a work rest 152 sufficiently spaced from the anvil 87 for the insertion of a garment between the anvil and the stapling head. Thumb rests 153 project from the upper ends of the front posts 11 and are adapted to co-act with finger pieces 154 projecting laterally outward from the arms of the trigger member 131 substantially beneath the thumb rests, in the operation of the invention which is as follows:

With the stapling mechanism S and operating member 25 occupying the extreme position shown in Figure 8; the channel 91 of the arm 83 loaded with a clip of staples 92; and the leading end of the strip stock A from a suitably supported roll inserted into the guideway 18, the printing wheels are adjusted to select the desired combination of numbers for printing.

Movement of the lever 25 to the other extreme position shown in Figure 10 will cause the feeding member 20 to feed the stock A forwardly in the guideway; raise the printing mechanism P to its inking position through the medium of the links 78 and the bell crank levers 70; and advance the distributing roller 64 from its ink-pick-up position in engagement with the inking pad 63, across the type 50 selected for printing.

Concurrently, the links 127 will co-act with the crosshead 125 to move the plunger rod 116 rearwardly and load the power spring 126, the upper pivoted portion 121 of the cam 114 striking the roller 113 and being swung thereby to the inactive position shown in broken lines in Figure 8, so as to permit the cam to pass the roller during this spring-loading movement.

As the lever 25 approaches its extreme position shown in Figure 10, the latching shoulders 133 of the trigger member 131 and the latching pins 134 of the crosshead 125, co-act under the urging action of the springs 135 upon the trigger member, to latch the power spring 126 in its fully loaded position shown in Figure 6. Upon releasing the operating member 25, it is restored by the spring 80 to the position shown in Figure 6, thus retracting the feed member 20 and the ink distributing roller 64, and restoring the printing mechanism P to its printing position, all as shown in this figure.

Also, during retraction of the plunger rod 116, the springs 119 act upon the levers 108 to pull the latter downwardly until in the final retracted position of the plunger rod the roller 113 will have cleared the cam 114 and the link 106 will have moved the ram 100 to its fully retracted position shown in the figure, and wherein the upper end of the ram is immediately below the level of the staple channel 91 in the arm 83, thus leaving the spring-pressed follower 93 free to advance the clip of staples 92 sufficiently for the leading staple to enter the ram groove 99 in advance of the ram, with the arm 101a of the spring 101 resting on this staple, as further shown in Figure 6.

The edge portion of a garment or other article to be marked is now manually inserted with both hands between the anvil 87 and the rest 152, and the thumbs of the operator are placed over the garment on the thumb rests 153 with the garment held taut. By engaging the index fingers with the undersides of the finger pieces 154 and exerting an upward pressure upon the latter, the trigger member 131 will be actuated for its latching shoulders 133 to disengage the latching pins 134 of the crosshead 125, thus freeing the power spring 126 which suddenly advances the cam 114 of the plunger head 115 through the medium of the crosshead and the plunger rod 116, to first cause the roller 113 to be carried upwardly by the fixed portion 120 of the cam until the roller strikes the upper pivoted portion 121 of the cam and swings same upwardly to its active position shown in broken lines in Figure 6, following which the roller is forced upwardly by the pivoted cam portion 121 to the top thereof as shown in Figure 7.

This camming action in raising the roller 113 and hence the levers 108, causes the ram 100 to be advanced upwardly in the groove 99 so as to separate from the inverted clip of staples 92 in the channel 91, the single staple previously pushed into the groove by the follower 93, and to force the staple through the groove. Concurrently with this ram movement, the friction of the ram in the groove 99 and the pulling force exerted upon the pin 109 by the levers 108 as a result of the forward pushing reaction of the cam 114 upon the roller 113, swings the stapling arm 83 upwardly about the fixed axis of its stub axles 85, so that during the movement of pushing the staple through the garment and the stock A, and clinching the staple against the anvil 87, the stapling arm will be firmly pressed against the underside of the garment, all as clearly shown in the instantaneous position of the parts shown in Figure 7.

During this stapling operation the impression pad 141 exerts its yielding pressure against the preselected inked type 50 of the printing wheels 49, to effect printing upon the stock A, and the cutting blade 144 is forced upwardly by the arm 83 from the lowered position shown in Figure 3, sufficiently to co-act with the fixed cutting blade 147 in shearing off that short length of stock in advance of the blades, thus forming the ticket T (Figure 11) which is securely stapled to the garment and is provided with an identifying mark.

As the advancing movement of the cam continues under the action of the power spring 126, beyond the position shown in Figure 7, the roller 113 rides off of the upper end of the cam 114 and is free to drop back and rest upon the top surface of the head 115, thus permitting the arm 83 to be pulled downwardly by its spring 89 sufficiently to release the garment, all as shown in Figure 8 which illustrates the final position of the parts and completes the cycle of operation of the machine. It will be noted that as the stapling arm 83 is thus pulled downwardly, the link 145 exerts a pull upon the cutting blade 144 to restore same to the position shown in Figure 3 wherein the blade clears the guideway for subsequent feeding of a predetermined length of stock past the blade.

It will also be noted that the arm 101a of the spring 101 which has been riding upon the single staple 92 in the groove 99 during advancing movement of the ram 100, has its length so calculated as to clear the groove immediately prior to the final stapling position of the ram, so as not to interfere with the stapling operation, yet to constantly hold the staple against the front end of the ram during the initial setting operation upon the machine to load the power spring 126. Thus, the spring 101 insures that only a single staple can occupy the groove 99 at any time so as to positively prevent jamming of the machine should the operator fail to fully complete the spring-loading operation in a single stroke of the operating member 25.

I claim:

1. In a machine of the class described, means defining a guideway for strip stock; stock feeding means; printing mechanism; stapling mechanism; spring power means; means for loading said power means; means for releasably retaining said power means loaded; means operatively connecting said stapling mechanism to said power means for actuation by the latter to effect a stapling operation upon stock in said guideway when said power means is released from said retaining means; means operatively connecting the stapling and printing mechanisms for actuating the printing mechanism is synchronism with the stapling operation to print upon the stock; and cutting means operated by said power means in synchronism with the aforestated stapling and printing operations for separating from the stock, that portion thereof subjected to the stapling and printing operations.

2. In a machine of the class described, means defining a guideway for strip stock; stock feeding means; printing mechanism; means mounting said printing mechanism for movement to occupy an inking position, and a printing position with respect to stock in said guideway; inking means for said printing mechanism; spring power means; means for loading said power means;

means operatively connecting the loading means to the printing mechanism to move the latter to inking position for inking of its type by said inking means during loading of said power means; means for releasably retaining said power means loaded; stapling mechanism; means operatively connecting said stapling mechanism to said power means for actuation by the latter to effect a stapling operation upon stock in said guideway when said power means is released from said retaining means; means operatively connecting the stapling and printing mechanisms for effecting printing on said stock by said printing mechanism; and cutting means operated by said power means in synchronism with the aforestated stapling and printing operations for separating from the stock, that portion thereof subjected to the printing and stapling operations.

3. In a machine of the class described, means defining a guideway for strip stock; stock feeding means; printing mechanism on one side of said guideway, including an ink fountain and an ink distributing roller; means mounting said printing mechanism for movement to occupy an inking position, and a printing position with respect to stock in said guideway; spring power means; means for loading said power means; means operatively connecting the loading means to the printing mechanism and ink distributing roller to move such mechanism to inking position and the said roller from an ink-pick-up position with respect to said ink fountain, to an inking position with respect to the type of said printing mechanism, during loading of said power means; means for releasably retaining said power means loaded; stapling mechanism on the other side of said guideway; means operatively connecting said stapling mechanism to said power means for actuation by the latter to effect a stapling operation upon stock in said guideway when said power means is released from said retaining means; impression means operable by said stapling mechanism during the stapling operation, to effect printing on said stock by said printing mechanism; and cutting means operated by said power means in synchronism with the aforestated stapling and printing operations for separating from the stock, that portion thereof subjected to the stapling and printing operations.

4. In a machine of the class described, means defining a guideway for strip stock; printing mechanism on one side of said guideway, including an ink fountain and an ink distributing roller; means mounting said printing mechanism for movement to occupy an inking position, and a printing position with respect to stock in said guideway; stapling mechanism on the other side of said guideway; spring power means; means for loading said power means including a pivoted operating member; a spring-urged arm carried by said member and on which said roller is mounted; means for releasably retaining said power means loaded; means operatively connecting said member to the printing mechanism to move the latter to inking position, and to move said roller from said fountain across the type of the printing mechanism; means operatively connecting said stapling mechanism to said power means for actuation by the latter to effect a stapling operation upon stock in said guideway when said power means is released from said retaining means; means operatively connecting the stapling and printing mechanisms for effecting printing on said stock by said printing mechanism; and cutting means operated by said power means in synchronism with the aforestated stapling and printing operations for separating from the stock, that portion thereof subjected to the stapling and printing operations.

5. In a machine of the class described, means defining a guideway for strip stock; printing wheels having peripheral type; a frame in which said wheels are mounted for rotational adjustment about a common axis; an ink fountain carried by said frame; means mounting said frame for movement to occupy an inking position and a printing position with respect to stock in said guideway; stapling mechanism on the other side of said guideway; spring power means; means for loading said spring power means including a pivoted operating member urged to one extreme position; means for releasably retaining said power means loaded; a bell-crank lever, one arm of which has a pin and slot connection to said frame; a link connected to the other arm of said lever and to said member to move said frame to inking position during loading of said power means by movement of said member from said one extreme position; an ink distributing roller; means mounting said roller from said member for movement thereby during loading of said power means, from an ink pick-up position with respect to said fountain, to roll over the type of said wheels; means operatively connecting said stapling mechanism to said power means for actuation by the latter to effect a stapling operation upon stock in said guideway when said power means is released from said retaining means; means co-acting with said printing wheels and operatively associated with said stapling mechanism, to effect printing upon the stock by said wheels; and cutting means operated by said power means in synchronism with the aforestated stapling and printing operations for separating from the stock, that portion thereof subjected to printing and stapling operations.

6. In a machine of the class described, a table having a guideway for strip stock; printing wheels having peripheral type; a frame in which said wheels are mounted for adjustment about a common axis; an ink fountain carried by said frame; side plates rising from said table; said side plates and frame having means mounting the latter for vertical movement to occupy a printing position with respect to stock in said guideway, and an inking position; stapling mechanism beneath the table; a power spring; means for loading said spring including a pivoted operating lever urged to one extreme position; means for releasably retaining said spring loaded; means operatively connecting said lever to said frame to move the latter to inking position during loading of said spring by movement of said lever from said one extreme position; an ink distributing roller; means yieldingly mounting said roller from said lever for movement thereby during loading of said spring, from an ink pick-up position relative to said fountain, across the type of said wheels to distribute ink thereon; means operatively connecting said stapling mechanism to said spring for actuation by the latter to effect stapling of the stock to an article when said power means is released from said retaining means; means co-acting with said printing wheels and operatively associated with said stapling mechanism, to effect printing upon the stock by said wheels; and cutting means operated by said power means in synchronism with the aforestated stapling and printing operations for severing from the stock, that portion thereof subjected to the stapling and printing operations.

7. In a machine of the class described, a table having a guideway for strip stock; printing wheels having peripheral type; a frame in which said wheels are mounted for adjustment about a common axis; an ink fountain carried by said frame; side plates rising from said table; said side plates and frame having means mounting the latter for vertical movement to occupy a printing position with respect to stock in said guideway, and an inking position; stapling mechanism beneath the table; a power spring; means for loading said spring including a pivoted operating lever urged to one extreme position; means for releasably retaining said spring loaded; a bell crank lever, one arm of which has a pin and slot connection to said frame; a link connected to the other arm of said bell crank lever and to said operating lever to move said frame to inking position during loading of said spring, by movement of the operating lever from said one extreme position; an ink distributing roller; a spring-urged arm mounting said roller from said operating lever for movement thereby during loading of said spring, from an ink pick-up position with respect to said fountain, across the type of said wheels to distribute ink thereon; means operatively connecting said stapling mechanism to said spring for actuation of the latter to effect stapling of the stock to an article when said spring is released from said retaining means; an impression member carried by the stapling mechanism and moved thereby against the stock to force the latter upwardly into printing engagement with preselected type of said printing wheels; and cutting means operated by said power means in synchronism with the aforestated stapling and printing operations for severing from the stock, that portion thereof which is stapled and printed.

8. In a machine of the class described, means defining a guideway for strip stock; printing mechanism on one side of said guideway, including an ink fountain and an ink distributing roller; means mounting said printing mechanism for movement to occupy an inking position, and a printing position with respect to stock in said guideway; spring power means; means for loading said spring power means; means operatively connecting the loading means to the printing mechanism and ink distributing roller, to move such mechanism to inking position and the distributing roller from an ink pick-up position with respect to said ink fountain, to an inking position with respect to type of said printing mechanism during loading of said power means; means for releasably retaining said power means loaded; stapling mechanism on the other side of said guideway; means operatively connecting said stapling mechanism to said power means for actuation by the latter to effect stapling of the stock in said guideway to an article inserted therein, when said power means is released from said retaining means; impression means operable by said stapling means during the stapling operation to effect printing on the stock by said printing mechanism; a feeding member urged into engagement with the stock in the guideway; means for actuating the feeding member in response to loading of said power means, to feed the stock forwardly a predetermined distance in said guideway; a holding member urged into engagement with the stock to prevent retrograde movement thereof; means by which said holding means may be moved clear of the stock; means responsive to movement of the holding member clear of the stock, to move the feeding member clear of the stock so as to leave the stock free in the guideway; and cutting means operated by said power means in synchronism with the aforestated stapling and printing operations for severing from the stock, that portion thereof which is stapled and printed.

9. In a machine of the class described, means defining a guideway for strip stock; printing mechanism on one side of said guideway, including an ink fountain and an ink distributing roller; means mounting said printing mechanism for movement to occupy an inking position, and a printing position with respect to stock in said guideway; spring power means; means for loading said power means; means operatively connecting the loading means to the printing mechanism and ink distributing roller to move such mechanism to inking position and the distributing roller from an ink pickup position with respect to said ink fountain, to an inking position with respect to type of said printing mechanism, during loading of said power means; means for releasably retaining said power means loaded; stapling mechanism on the other side of said guideway; means operatively connecting said stapling mechanism to said power means for actuation by the latter to effect a stapling operation upon stock in said guideway when said power means is released from said retaining means; impression means operable by said stapling mechanism during the stapling operation, to effect printing on said stock by said printing mechanism; a stock feeding member urged into engagement with stock in said guideway; means for actuating said feeding member in response to loading of said power means, to feed the stock forwardly a predetermined distance in said guideway; a holding member urged into engagement with stock in said guideway to prevent retrograde movement of the stock; means by which said holding member may be moved clear of the stock; means responsive to movement of the holding member clear of the stock, to move the feeding member clear of the stock so as to leave the stock free in the guideway; a fixed cutting blade extending across said guideway on one side thereof; a second cutting blade pivotally mounted on the other side of said guideway for co-action with the first said blade; and means operatively connecting the second said cutting blade to the stapling mechanism for movement by the latter to sever from the stock, that portion thereof which is stapled and printed.

10. In a machine of the class described, means defining a guide way for strip stock; printing mechanism at one side of the guideway; a stapling arm having a staple-receiving channel; a stapling head on said arm having a staple-receiving groove extending laterally with respect to said channel and adapted to receive the leading staple from the latter; an anvil co-actable with said head; means pivotally mounting said arm at the other side of said guideway; means urging said arm away from said anvil to a position wherein the arm is spaced from the anvil; a staple feeding ram mounted in said groove; means urging staples in said channel towards said groove; a power spring; means for loading said spring; means for releasably retaining said spring loaded; means responsive to the force exerted by said spring when released from said retaining means, to actuate said ram and move said arm towards said anvil for co-action of said head with said anvil in stapling through an interposed article and the stock in said guideway; means operatively associating said printing mechanism with said arm for actuation thereby to effect printing upon the stock by said printing mechanism; and cutting means operated by said power means in synchronism with the aforestated stapling and printing operations for separating from the stock, that portion thereof stapled and printed upon.

11. In a machine of the class described, means defining a guideway for strip stock; printing mechanism at one side of the guideway; a stapling arm having a staple-receiving channel; a stapling head on said arm having a staple-receiving groove extending laterally with respect to said channel and adapted to receive the leading staple from the latter; an anvil co-actable with said head; means pivotally mounting said arm about a fixed axis; means urging said arm away from said anvil to a position wherein the arm is spaced from the anvil; a staple feeding ram mounted in said groove; means urging staples in said channel towards said groove; a power spring; means for loading said spring; means for releasably retaining said spring loaded; a cam movable by said spring-loading means to one extreme position; means operatively connected to said ram, and responsive to movement of the cam to another extreme position by said spring when released from said retaining means, to advance said ram in said groove and move said arm to stapling position for co-action of said head and anvil in stapling through an interposed article and the stock in said guideway; means operatively associating said printing mechanism with said arm for actuation thereby to effect printing upon the stock by said printing mechanism; and cutting means operated by said power means in synchronism with the aforestated stapling and printing operations for severing from the stock, that portion thereof stapled and printed upon.

12. In a machine of the class described, means defining a guideway for strip stock; printing mechanism; an arm having a staple-receiving channel; a stapling head on the arm having a groove extending laterally with respect to said channel and adapted to receive the leading staple from the latter; an anvil co-actable with said head; means pivotally mounting the arm about a fixed axis; means urging said arm away from said anvil to a position wherein the arm is spaced from the anvil; a staple feeding ram mounted in said groove; means urging staples in said channel towards said groove; a power spring; means for loading said spring; means for releasably retaining said spring loaded; a reciprocably mounted cam operatively connected to said spring-loading means for movement to one extreme position; a lever mounted on said arm for movement about an axis eccentrically related to the axis of the arm; means operatively connecting said lever to said ram; means on said lever with which the cam co-acts when moved to another position by said spring when released, to actuate said ram and move said arm to stapling position for co-action of said ram and anvil in stapling through an interposed article and the stock in said guideway; means operatively associating said printing mechanism with said arm for actuation thereby to effect printing upon the stock by said printing mechanism; and cutting means operated by said power means in synchronism with the aforestated stapling and printing operations for severing from the stock, that portion thereof stapled and printed upon.

13. In a machine of the class described, means defining a guideway for strip stock; printing mechanism; a stapling arm having a staple-receiving channel; a stapling head on the arm having a groove extending laterally with respect to said channel and adapted to receive the leading staple from the latter; an anvil co-actable with said head; means pivotally mounting the arm about a fixed axis; means urging said arm away from said anvil to a position wherein the arm is spaced from the anvil; a ram mounted in said groove; means urging staples in said channel towards said groove; a power spring; means for loading said spring; means for releasably retaining said spring loaded; a reciprocably mounted cam operatively connected to said spring loading means for movement to one extreme position; a lever mounted on said arm for movement about an axis eccentrically related to the axis of the arm; means operatively connecting said lever to said ram; means on said lever with which the cam co-acts when moved to another extreme position by said spring when released, to actuate said lever and advance said ram in said groove; said eccentric relationship between the axes of said arm and lever being such that in response to said actuation of the lever by the cam, the latter will exert a force upon the lever reacting upon the arm to move the latter to stapling position for co-action of the ram and anvil in stapling through an interposed article and the stock in said guideway; means operatively associating said printing mechanism with said arm for actuation thereby to effect printing upon the stock by the printing mechanism; and cutting means operated by said power means in synchronism with the aforestated stapling and printing operations for severing from the stock, that portion thereof stapled and printed upon.

14. In a machine of the class described, means defining a guideway for strip stock; printing mechanism; an arm having a staple-receiving channel; a stapling head on said arm having a groove extending laterally with respect to said channel and adapted to receive the leading staple from the latter; an anvil co-actable with said head; means pivotally mounting the arm about a fixed axis; means urging said arm away from said anvil to a position wherein the arm is spaced from the anvil; a ram mounted in said groove; means urging staples in said channel towards said groove; a power spring; means for loading said spring; means for releasably retaining said spring loaded; a reciprocably mounted cam operatively connected to said spring-loading means for movement to one extreme position; a lever mounted on said arm for movement about an axis eccentrically related to the axis of the arm; means operatively connecting said lever to said ram; means on said lever with which the cam co-acts when moved to another extreme position by said spring when released, to actuate said ram and move said arm to stapling position for co-action of said ram and anvil in stapling through an interposed article and the stock in said guideway; means operatively associating said printing mechanism with said arm for actuation thereby to effect printing upon the stock by said printing mechanism; and cutting means operated by said power means in synchronism with the aforestated stapling and printing operations for severing from the stock, that portion thereof stapled and printed upon; said cam clearing its co-acting means on the lever when the stapling operation is completed, so as to permit the lever to release the arm for movement by its urging means to a non-stapling position wherein the article and at- 15. In a machine of the class described, means defining a guideway for strip stock; printing mechanism; a stapling arm having a staple-receiving channel; a stapling head on said arm having a groove extending laterally with respect to said channel and adapted to receive the leading staple from the latter; an anvil co-actable with said head; means pivotally mounting said arm about a fixed axis; means urging said arm away from said anvil to a position wherein the arm is spaced from the anvil; a ram mounted in said groove; means urging staples in said guideway towards said groove; a reciprocably mounted plunger rod having a crosshead fixed thereto; a power spring mounted on said rod and having a vertical wedge cam; an operating member; means operatively connecting said member to said crosshead to load the spring and move the cam to one extreme position in response to an actuation of the operating member; a trigger member; said trigger member and cross-head having means coacting to releasably retain the spring loaded; a spring-urged lever mounted on said arm for vertical movement about an axis eccentrically related to the axis of the arm; means operatively connecting said lever to said ram; a roller carried by said lever and urged by the latter into engagement with the cam for coaction therewith in response to movement of the cam to another extreme position by said spring when released by the trigger member, to actuate said ram and move said arm to stapling position for coaction of said ram and anvil in stapling through an interposed article and the stock in said guideway; means operatively associating said printing mechanism with said arm for actuation thereby to effect printing upon the stock by the printing mechanism; and cutting means operated by said power means in synchronism with the aforestated stapling and printing operations for severing from the stock, that portion thereof stapled and printed upon.

16. In a machine of the class described, means defining a guideway for strip stock; printing mechanism; an arm having a staple-receiving channel; a stapling head on said arm having a groove extending laterally with respect to said channel and adapted to receive the leading staple from the latter; an anvil co-actable with said head; means pivotally mounting said arm about a fixed axis; means urging said arm away from said anvil to a position wherein the arm is spaced from the anvil; a ram mounted in said groove; means urging staples in said guideway towards said groove; a reciprocably mounted plunger rod having a crosshead fixed thereto and provided with a vertical wedge cam; a power spring mounted on said rod; an operating member; means operatively connecting said member to said crosshead to load the spring and move the cam to one extreme position in response to an actuation of the operating member; a trigger member; said trigger member and crosshead having means coacting to releasably retain the spring loaded; a spring-urged lever mounted on said arm for vertical movement about an axis eccentrically related to the axis of the arm; means operatively connecting said lever to said ram; a roller carried by said lever and urged by the latter into engagement with the cam for co-action therewith in response to movement of the cam to another extreme position by said spring when released by the trigger member, to actuate said ram and move said arm to stapling position for co-action of said ram and anvil in stapling through an interposed article and the stock in said guideway; means operatively associating said printing mechanism with said arm for actuation thereby to effect printing upon the stock by said printing mechanism; and cutting means operated by said power means in synchronism with the aforestated stapling and printing operations for severing from the stock, that portion thereof stapled and printed upon; said roller passing off of said cam following completion of the stapling operation to permit the lever to release the arm for movement by its urging means to a non-stapling position wherein the article and attached stock are freed for removal; said cam having a pivotally mounted portion enabling said roller to pass the cam upon movement thereof to again load the spring.

17. In a machine of the class described, an anvil; an arm pivotally mounted about a fixed axis and having a staple-receiving channel; a stapling head on said arm spaced from said anvil and having a groove extending laterally with respect to said channel to receive the leading staple from the latter; a ram mounted in said groove; means urging staples in said channel towards said groove; a power spring; means for loading said spring; means for releasably retaining said spring loaded; and means responsive to the force exerted by said spring when released from the retaining means, to actuate said ram and move said arm towards said anvil for co-action therewith in stapling through interposed material.

18. In a machine of the class described, an anvil; an arm beneath the anvil, pivotally mounted about a fixed axis and having a staple-receiving channel; a stapling head on said arm spaced from said anvil and having a groove extending laterally with respect to said channel to receive the leading staple from the latter; a ram mounted in said groove; means urging staples in said channel towards said groove; power means for actuating said arm and ram to effect a stapling operation upon material interposed between said head and anvil by exerting a momentary force; means for setting said power means to create said force; and means for releasing the power means to render same free to act as aforestated.

CLAIR B. WELLER.

REFERENCES CITED

The following references are of record in the file of this patent:

UNITED STATES PATENTS

| Number | Name | Date |
|---|---|---|
| 960,206 | Silverstein | May 31, 1910 |
| 1,048,136 | Davis | Dec. 24, 1912 |
| 1,197,277 | Ellis | Sept. 5, 1916 |
| 1,887,731 | Obstfeld | Nov. 15, 1932 |
| 1,919,373 | Krantz | July 25, 1933 |
| 2,083,227 | Drypolcher | June 8, 1937 |